United States Patent [19]

Luby

[11] Patent Number: 5,174,798

[45] Date of Patent: Dec. 29, 1992

[54] MULTIPLE FILTER CARTRIDGE POSITION LIMITING DEVICE

[75] Inventor: Charles J. Luby, Pleasant Garden, N.C.

[73] Assignee: Ingersoll-Rand Company, Woodcliff Lake, N.J.

[21] Appl. No.: 848,795

[22] Filed: Mar. 10, 1992

[51] Int. Cl.⁵ ............................................. B01D 53/04
[52] U.S. Cl. ........................................ 55/179; 55/316; 55/318; 55/DIG. 17
[58] Field of Search ................. 55/179, 316, 318, 320, 55/322, 323, 387, DIG. 17

[56] References Cited

U.S. PATENT DOCUMENTS 4,801,313  1/1989  Mann ..................................... 55/179
5,061,300  10/1991  Alexander ........................ 55/316 X Primary Examiner—Charles Hart
Attorney, Agent, or Firm—Glenn B. Foster

[57] ABSTRACT

A filter device includes a first purifier chamber having a first recess. A first filter cartridge is capable of being disposed within the first recess. A second purifier chamber, including a second recess, is included in the filter device. A second filter cartridge is capable of being disposed within the second recess. A contour element is associated with the second filter cartridge, the contour element being configured to resist insertion of the second filter cartridge within the first recess. A mounting portion is formed in each recess and is configured to engage with a mating portion formed on each filter cartridge. The mating portion of each type of filter cartridge is specific as to not be able to be inserted into any recess but those recesses configured for that type of filter cartridge.

12 Claims, 3 Drawing Sheets

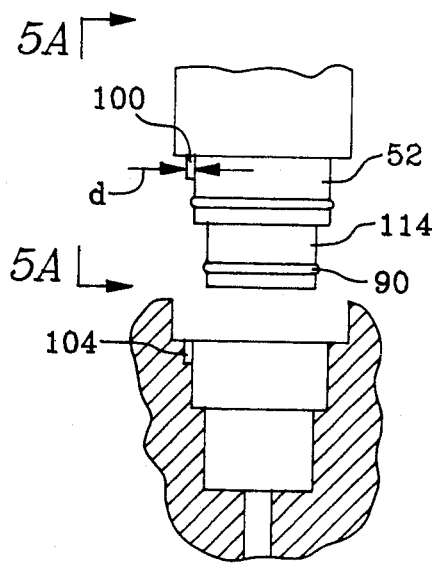
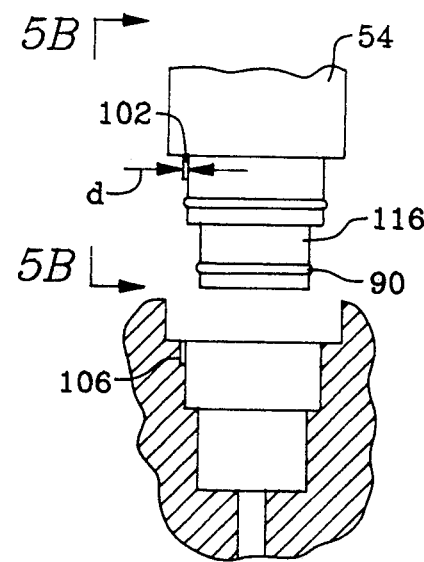
FIG. 4A        FIG. 4B
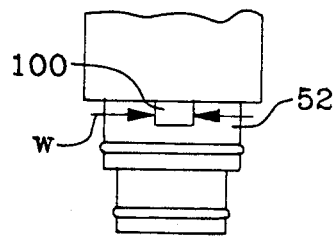
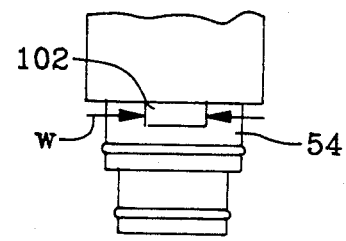
FIG. 5A        FIG. 5B
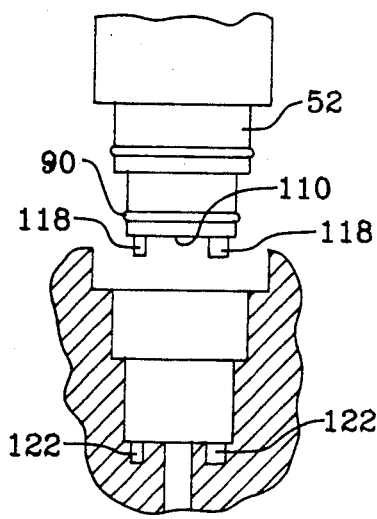
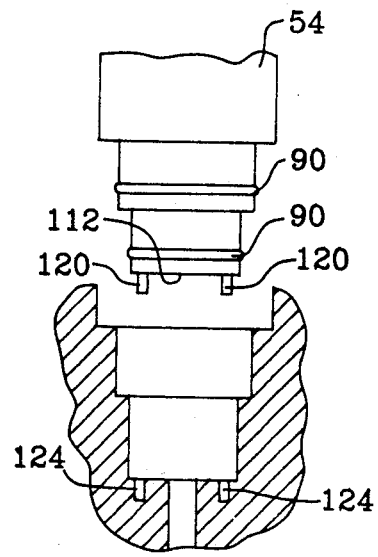
FIG. 6A        FIG. 6B

MULTIPLE FILTER CARTRIDGE POSITION LIMITING DEVICE

BACKGROUND OF THE INVENTION

This invention relates generally to filter devices and more particularly to devices which ensure that the position which multiple types of filter cartridges are positioned in are not altered. Presently, compressed fluid systems are used to provide compressed breathing air to be used in such applications as fire fighting or underwater diving. There are typically one or more compressed fluid systems to provide breathing air for small dive shops or for a single fire departments, except for the larger demand areas which may require more. The process required to compress fluid into the compressed fluid system also compresses whatever moistures and impurities may be contained in the air. It is highly desirable to remove as many of these impurities which are present in the original air as possible prior to or during compression of the air to limit the impurities breathed by the user, as well as restricting damage which may be done to the tank by accumulated moisture and impurities over an extended period. To accomplish this purification, filter cartridges are incorporated in the compressed fluid purification systems.

In the present systems, more than one filter cartridge may be arranged in series. Each filter cartridge contains filtering materials depending on what that specific filter is intended to remove. For this reason, adjacent tanks often contain different materials to perform different functions. For example, in present purification systems, the initial filters often remove moisture from the air while the later filters often remove the impurities. Placing the correct filter in the correct order tends to prolong the life and increase the effectiveness of the impurity removing filters.

In present filtration systems, the configuration of filter cartridges for the different filters are identical. In practise, often the cartridges are often placed in the incorrect locations resulting in a less than ideal filtering configuration. It is highly desirable to produce a configuration whereby the filter cartridges can fit only in their correct location. In this manner, the filter cartridge life may be extended while the filter process quality is improved.

The foregoing illustrates limitations known to exist in present filtering systems involving multiple filter cartridges. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a filter device including a first chamber including a first recess. A first filter cartridge is capable of being disposed within the first purifier recess. A second purifier chamber, including a second recess, is included in the filter device. A second filter cartridge is capable of being disposed within the second recess. A contour element is associated with the second filter cartridge, the contour element being configured to resist insertion of the second filter cartridge within the first recess.

The foregoing and other aspects will become apparent from the following detailed description of the invention when considered in conjunction with the accompanying drawing figures.

BRIEF DESCRIPTION OF THE DRAWING FIGURES

FIGS. 4a and 4b are exploded views similar to FIGS. 3a and 3b of alternate embodiments of mounting portions and mating portions of the present invention;

Figure 3A:
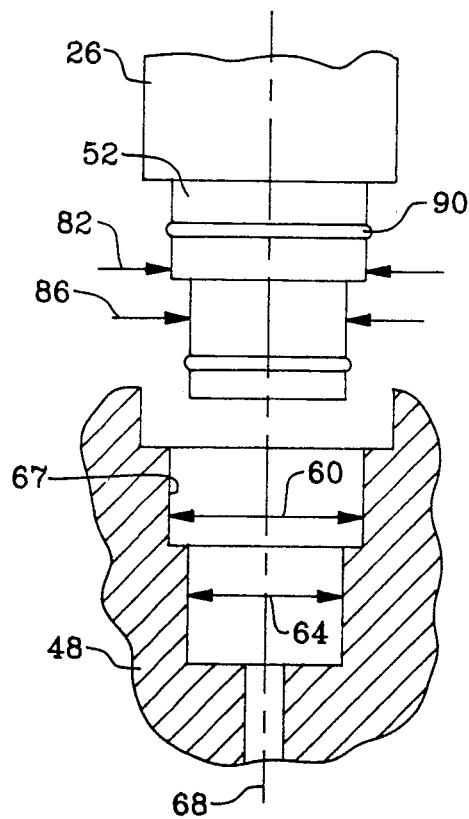
FIGS. 3a and 3b are exploded views of the mounting portion and the mating portion illustrated in FIG. 2.
Figure 3B:
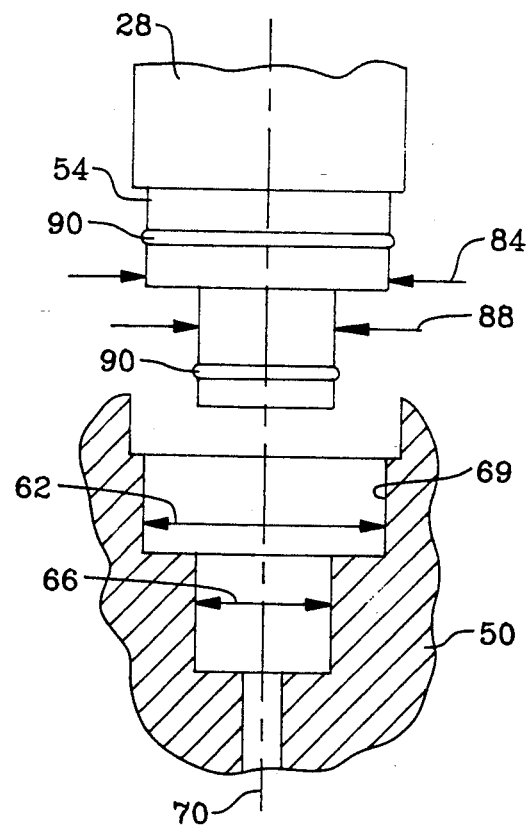

FIGS. 5a and 5b are views taken along sectional lines 5a and 5b of FIGS. 4a and 4b, respectively; and FIGS. 6a and 6b are exploded views similar to FIGS. 3a and 3b of yet another alternate embodiment of the present invention.

DETAILED DESCRIPTION

Figure 1:
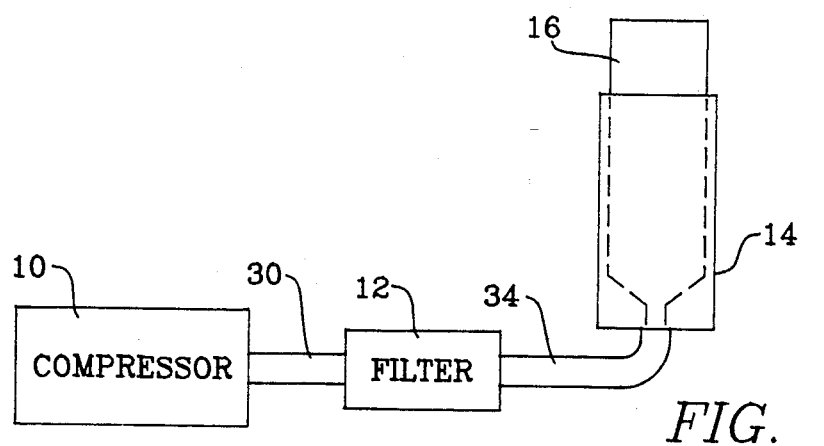
FIG. 1 is schematic view illustrating a compressor arrangement utilizing a filter assembly typical of the present invention.

A compressor is illustrated generally as 10 in FIG. 1. The compressor discharges compressed fluid through a filter assembly 12 and into a supply element 14. The supply element 14, when in operation, supports canister(s) 16 which are configured to be portable. One application of this configuration is when breathing air is compressed into canister 16 for such uses as supplying breathing air to fire fighters, scuba divers, or other areas utilizing compressed breathing air.

Figure 2:
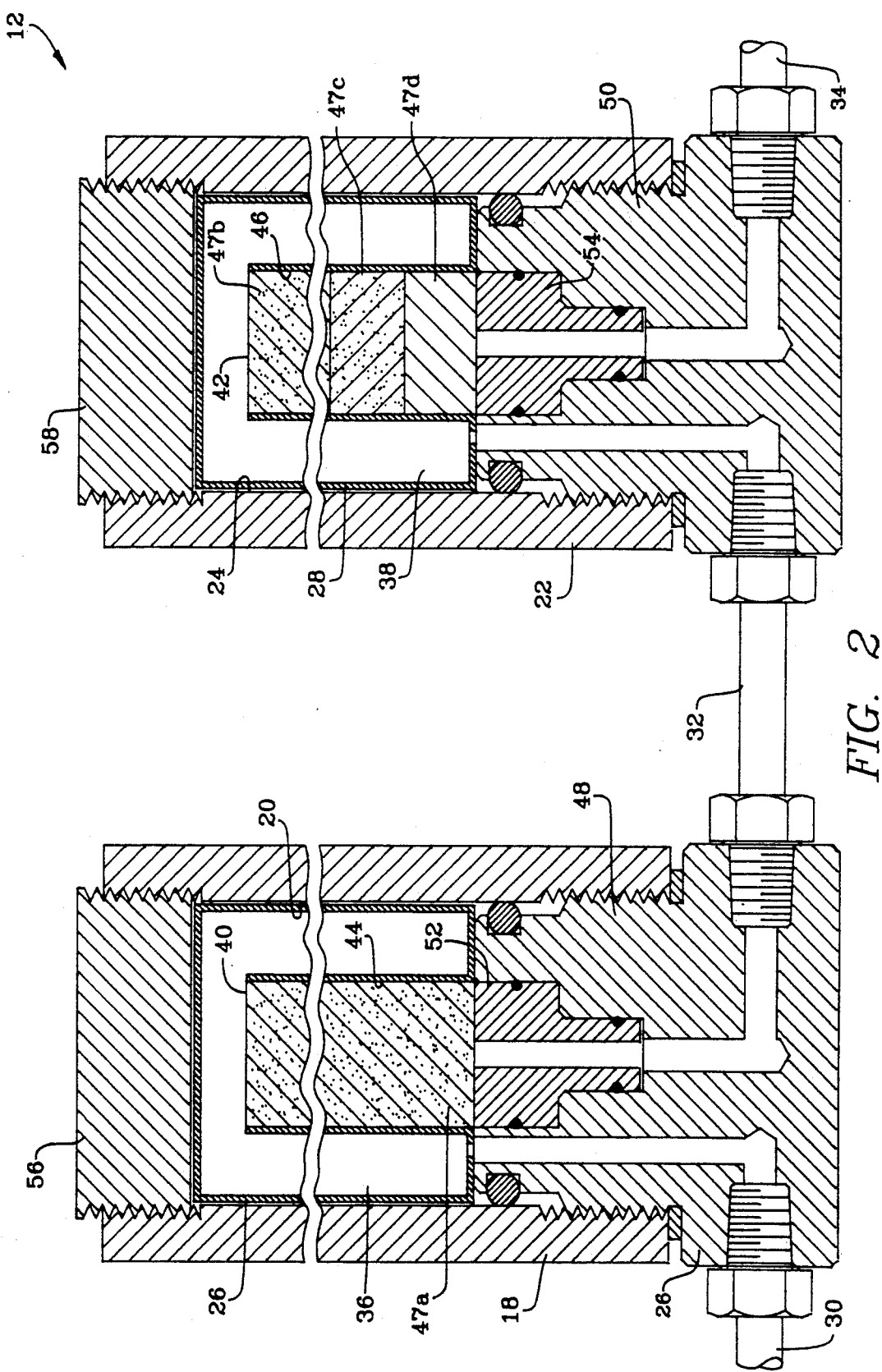
FIG. 2 is a partial cross sectional view of one embodiment of filter assembly of the present invention.

The filter assembly 12, FIG. 2, includes the first purifier chamber 18 containing a first filter recess 20 and a second purifier chamber 22 containing a second filter recess 24. Even though there are often two purifier chambers in a filter assembly, there may be more or fewer depending upon the filtering application. A first filter cartridge 26 fits within the first filter recess 20 while a second filter cartridge 28 fits within the second filter recess 24. A first conduit 30 communicates fluid from the compressor 10 to the first purifier chamber 18. A second conduit 32 communicates fluid from the first purifier chamber 18 to the second purifier chamber 22. A third conduit 34 communicates fluid from the second purifier chamber 22 to the supply element 14. If more purifier chambers are to be connected, they are simply added in series, with a corresponding number of conduits inserted.

For the remainder of the specification, since much of the structure relates to structurally similar purifier chambers 18, 22, filter recesses 20, 22, and filter cartridges 26, 28; the description will contain reference to only a single named element followed by two reference characters. The first reference character will relate to those elements associated with the first purifier chamber 18 while the second reference character will relate to those elements relating to the second purifier chamber 22.

The first conduit 30 and the second conduit 32 are in fluid communication with angular recesses 36, 38 within the first and the second filter cartridges 26, 28, respectively. Angular recesses are in fluid communication with a filter material containment portion 44, 46 which contain whichever filter material, or combinations of filter material, 40, 42 as is desired for the specific application. Filter material containment portions 44, 46 are in fluid communication with the second conduit 32 and third conduit 34, respectively, which fluid being discharged from the filter cartridges 26, 28 exit to.

To provide an indication of what filter material may be contained in the different purifier chambers, in breathing air applications, the first filter material containment portion 44 typically is entirely filled with a desiccant material 47a which removes moisture from the air. The second filter material containment portion contains three layers including a second desiccant layer 47b, an activated carbon layer 47c for removing odors from the breathing air and a catalyst layer 47d for converting carbon monoxide into carbon dioxide.

In breathing air applications, if the filter cartridge containing the desiccant, activated carbon and a catalyst as the filter material is placed prior to the filter cartridge containing pure desiccant as the filter material, then the activated carbon and catalyst will become saturated and ineffective. This ineffectiveness and short life of the filter material is highly undesirable in breathing air applications. It should be understood that ensuring the proper order of the filter cartridges will prolong the life and effectiveness of the filter cartridges (which are relatively expensive to replace). The described filter material is for illustration and not intended to be limiting in scope of the present disclosure.

The purifier chambers 18, 22 contain mounting portions 48, 50. The filter cartridges 26, 28 contain mating portions 52, 54. The mating portions 52, 54 are configured to interfit with their respective mounting portions 48, 50. Securing caps 56, 58 encase the filter cartridges 26, 28 within the purifier chambers 18, 22 in such a fully inserted position wherein the mounting portions 48, 50 are in a proximal position relative to mating portions 52, 54.

The term proximal position (using the first filter cartridge 26 as an example) as used herein indicates that the first filter cartridge 26 is positioned such that fluid passing from the first conduit 30 will pass to the second conduit 32 after passing through the first filter cartridge 26. Similarly, when the second mating portion 54 is in a proximal position with the second mounting portion 50, virtually all the fluid passing from the second conduit 32 through the second filter cartridge will pass through to the third conduit 34.

The mounting portions 48, 50 of the FIGS. 3a and 3b embodiments are configured to have mounting major diameters 60, 62 and mounting minor diameters 64, 66 (the major diameters 60, 64 and 62, 66 being coaxial about axis 68, 70), and define continuous internal surfaces 67, 69 of the mounting portions. The mating portions 52, 54 have two cylindrical portions which are defined by coaxial mating major diameters 82, 84 and mating minor diameters 86, 88 (which are also coaxial about the axis 68, 70 when in the inserted positions).

The mounting major diameters 60, 62 and the mounting minor diameters 64, 66 are chosen to be slightly larger than the mating major diameters 82, 84 and the mating minor diameters 86, 88, respectively, to produce a sliding fit therebetween. The sliding fit must be large enough to permit insertion of the filter cartridges 26 28 into the purifier recesses 20, 24 to the fully inserted positions (and also the respective retraction of the filter cartridges from the fully inserted positions) using only reasonable force which an operator would easily be able to be able to apply without structural damage to the filter cartridges.

The tolerances of the sliding fit described in the last paragraph must also be tight enough to permit sealing between the mounting portions 48, 50 and the mating portions 52, 54. Sealing will also be accomplished between the mounting major diameters 60, 62 and the mating major diameters 82, 84; and the mounting minor diameters 64, 66 with the mounting minor diameters 86, 88. This sealing is accomplished with the assistance of seals 90. The sliding fit must also account for the extremely high pressures which are typically applied to each filter assembly 12 during operation.

In the FIGS. 4a, 4b, 5a, 5b, 6a and 6b embodiments, the mounting minor diameters 64, 66 are equal, the mounting major diameters 60, 62 are also equal. Similarly, the mating minor diameters 86, 88 are equivalent while the mating major diameters 82, 84 are also equal. It is essential that the tolerances of the sliding fit described above be used in these embodiments as well.

In the FIGS. 4a and 4b embodiment, projections 100, 102 radially extend from the mating portions 52, 54. Also, apertures 104, 106 are formed in the mounting portion 48, 50. Each projection 100, 102 is of such a dimension to permit displacement of the mating portions 52, 54 relative to the mounting portions 48, 50 to and from the proximal position, as described below. It is important to have the projections 100, 102 located on a portion of the mating portions 52, 54 wherein when the mating portion is in the proximal position, no portion of the aperture will be exposed to the seal 90 which would likely result in fluid passage through the aperture past the seal. This fluid passage would be especially pronounced under the high pressure typically applied to the filter assembly 12 in breathing air and similar applications.

FIGS. 5a and 5b illustrate the relative width w of the two projections 100, 102 and the associates apertures 104, 106 used in FIGS. 3a and 3b while FIGS. 4a and 4b illustrate the relative depth d. The first projection 100 is of a greater depth d than of the second projection, but of a lesser width w. This relative sizing limits the placement of either filter cartridge 26, 28 in the incorrect filter recess 20, 24.

In FIGS. 6a and 6b, multiple protuberances 118, 120 which are formed on end faces 110, 112, fit within openings 122, 124 of the mating portions 52, 54 similarly to how the projections 100, 102 are formed on the side faces 114, 116 in the FIGS. 4a and 4b embodiment. The relative number, and sizes, space between and depth of the protuberances 118, 120 and the openings 122, 124 are specific to filter cartridges of each type similar to that described in the prior paragraph for the relative sizing between the projections 100, 102 and the apertures 104, 106.

What is common in all of the above mentioned embodiments is that the there are multiple types of filter cartridges, each type typically contain different filtering materials depending upon the application and is configured to fit within one or more specific recesses only configured for that type of filter cartridge, and not in filter recesses configured for other types of filter cartridges.

While this invention has been illustrated and described in accordance with a preferred embodiment, it is recognized that other variations and changes may be made therein without departing from the invention as set forth in the claims.

Having described the invention, what is claimed is:
1. A filter apparatus comprising:
a first purifier chamber including a first recess;

a first filter cartridge, capable of being disposed within the first recess;

a second purifier chamber including a second recess;

a second filter cartridge, capable of being disposed within the second recess; and a contour element associated with the second filter cartridge, the contour element being configured to resist insertion of the second filter cartridge within the first recess.

2. The apparatus as described in claim 1, further comprising:

a first mounting portion partially defining the first recess;

a first mating portion affixed to the first filter cartridge, the first mating portions is capable of being positioned adjacent the first mounting portion in a proximal position;

a second mounting portion partially defining the second recess; and a second mating portion affixed to the second filter cartridge, the second mating portion is capable of being positioned adjacent the second mounting portion in the proximal position.

3. The apparatus as described in claim 2, wherein the contour element is affixed to the second mating portion.

4. The apparatus as described in claim 2, further comprising: a first mounting major diameter and a coaxial first mounting minor diameter being defined in the first mounting portion;

a first mating major diameter and a coaxial first mating minor diameter being defined in the first mating portion;

a second mounting major diameter and a coaxial second mounting minor diameter being defined in the second mounting portion; and a second mating major diameter and a coaxial second mating minor diameter being defined in the second mating portion.

5. The apparatus as described in claim 4, wherein said first mounting major diameter is greater than the first mating major diameter by amounts which permit a relative sliding contact therebetween.

6. The apparatus as described in claim 2, wherein the contour element further comprises:

a first aperture defined within the first mounting portion; a first projection extending from the first mating portion, the first projection being disposed within the first aperture when the first mating portion is in the proximal position;

a second aperture defined within the second mounting portion; and a second projection extending from the second mating portion, the second projection being disposed within the second aperture when the second mating portion is in the proximal position.

7. The apparatus as described in claim 6, wherein the second projection is configured to resist being disposed within the first aperture, thereby resisting insertion of the second mating portion to a proximal position relative to the first mounting portion.

8. The apparatus as described in claim 7, further comprising:

major seals mounted circumferentially about each major mating diameter; and minor seals mounted circumferentially about each minor mating diameter.

9. The apparatus as described in claim 2, wherein the contour element further comprises:

a first opening defined within the first mating portion;

a first protuberance extending from the first mounting portion, the first protuberance being disposed within the first opening when the first mating portion is in the proximal position;

a second opening defined within the second mating portion; and a second protuberance extending from the second mounting portion, the second protuberance being disposed within the second opening when the second mating portion is in the proximal position.

10. The apparatus as described in claim 9, wherein the second protuberance is configured to resist being disposed within the first opening, thereby resisting insertion of the second mating portion to a proximal position relative to the first mounting portion.

11. An apparatus comprising:

a compressor means for compressing fluid;

a first purifier chamber including a first recess which is in fluid communication with the compressor means;

a first filter cartridge, capable of being disposed within the first recess;

a second purifier chamber including a second recess which is in fluid communication with the first recess;

a second filter cartridge, capable of being disposed within the second recess; and a first contour element associated with the second filter cartridge, the contour element being configured to resist insertion of the second filter cartridge into the first recess.

12. The apparatus as described in claim 11, further comprising:

a second contour element associated with the first filter cartridge, the contour element being configured to resist insertion of the first filter cartridge into the second recess.

* * * * *